US011513901B2

(12) United States Patent
Kumar et al.

(10) Patent No.: US 11,513,901 B2
(45) Date of Patent: Nov. 29, 2022

(54) OPTIMIZING BACKUP PERFORMANCE WITH HEURISTIC CONFIGURATION SELECTION

(71) Applicant: EMC IP Holding Company LLC, Hopkinton, MA (US)

(72) Inventors: Dinesh Kumar, Bangalore (IN); Anand Reddy, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 22 days.

(21) Appl. No.: 17/313,623

(22) Filed: May 6, 2021

(65) Prior Publication Data
US 2021/0255930 A1 Aug. 19, 2021

Related U.S. Application Data

(63) Continuation of application No. 16/170,477, filed on Oct. 25, 2018, now Pat. No. 11,010,253.

(51) Int. Cl.
*G06F 16/00* (2019.01)
*G06F 11/14* (2006.01)
*G06F 16/174* (2019.01)

(52) U.S. Cl.
CPC ........ *G06F 11/1451* (2013.01); *G06F 16/174* (2019.01)

(58) Field of Classification Search
CPC .................................................. G06F 16/174
See application file for complete search history.

(56) References Cited

U.S. PATENT DOCUMENTS

2016/0239555 A1* 8/2016 Kumarasamy ...... G06F 16/2365

* cited by examiner

*Primary Examiner* — Ajith Jacob
(74) *Attorney, Agent, or Firm* — Staniford Tomita LLP (57) ABSTRACT

Embodiments are described for a heuristic configuration selection process as part of or accessible by the backup management process. This processing component provides a method to automatically determine the configuration parameters needed to obtain optimal performance for a given backup/restore job. This process involves identifying key parameters that determine backup performance and suggest means to derive and incorporate those configurable parameters into the backup software automatically. Embodiments can be applied to stream based backups, or other types of backup software as well.

20 Claims, 6 Drawing Sheets

OPTIMIZING BACKUP PERFORMANCE WITH HEURISTIC CONFIGURATION SELECTION

CROSS-REFERENCE TO RELATED APPLICATIONS

This application is a continuation application of and claims priority to U.S. patent application Ser. No. 16/170,477, filed Oct. 25, 2018, entitled "Optimizing Backup Performance with Heuristic Configuration Selection," and which is incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to data backup systems, and more particularly to systems and methods for optimizing backup performance using heuristic configuration selection.

BACKGROUND OF THE INVENTION

Computer operations, including backup and restore programs, can be said to be working at optimal performance when the input, processing, and output are in equilibrium. A backup/restore program is at its optimal performance state when the data ingested from a source device at a certain rate is processed and written to the backup device at the same rate. Performance levels should be set such that both source and backup devices are neither under-utilized nor over-utilized.

In any modern data protection software, such as enterprise copy data management (eCDM) systems, it is critical to have predictability of backup/restore performance in order to complete the backup job at designated time to comply with the protection plan and compliance set by the backup administrator. Data protection software currently has configurable parameters that can be adjusted manually, such as by backup administrators to make the software operate at certain performance levels. Most of the time such manual settings limit the capability of the backup software to operate at optimal performance, and compromise the ability to adhere to the protection plan and compliance set aside by backup administrator.

Manual configuration also poses additional challenges since the values for the configurable parameters are mostly dynamic in nature, and vary from customer to customer and instance to instance in typical operating environments. This brings unpredictability to the backup software performance for a given environment. With manual configuration, backup software is not optimally tuned for performance and efficiency for every backup job. Resource utilization on application host, primary storage or protection storage can be either under-utilized or over-utilized based on type and time of the backup job. At times, the backup software may fail to adhere to the compliance plan set by the backup admin if the manually set backup window is unrealistic.

Another problem is that the backup administrator needs deeper knowledge of the backup software and source/backup devices in order to derive optimal performance levels. Failure of this condition can also lead to a situation of under or over-utilization. Finally, the backup administrator needs to manually adjust the performance levels for individual jobs and systems, which can be time consuming.

What is needed, therefore, is a system and method that automatically determines the configuration parameters needed to obtain optimal performance for a given backup/restore job, and that can be implemented in any backup software system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
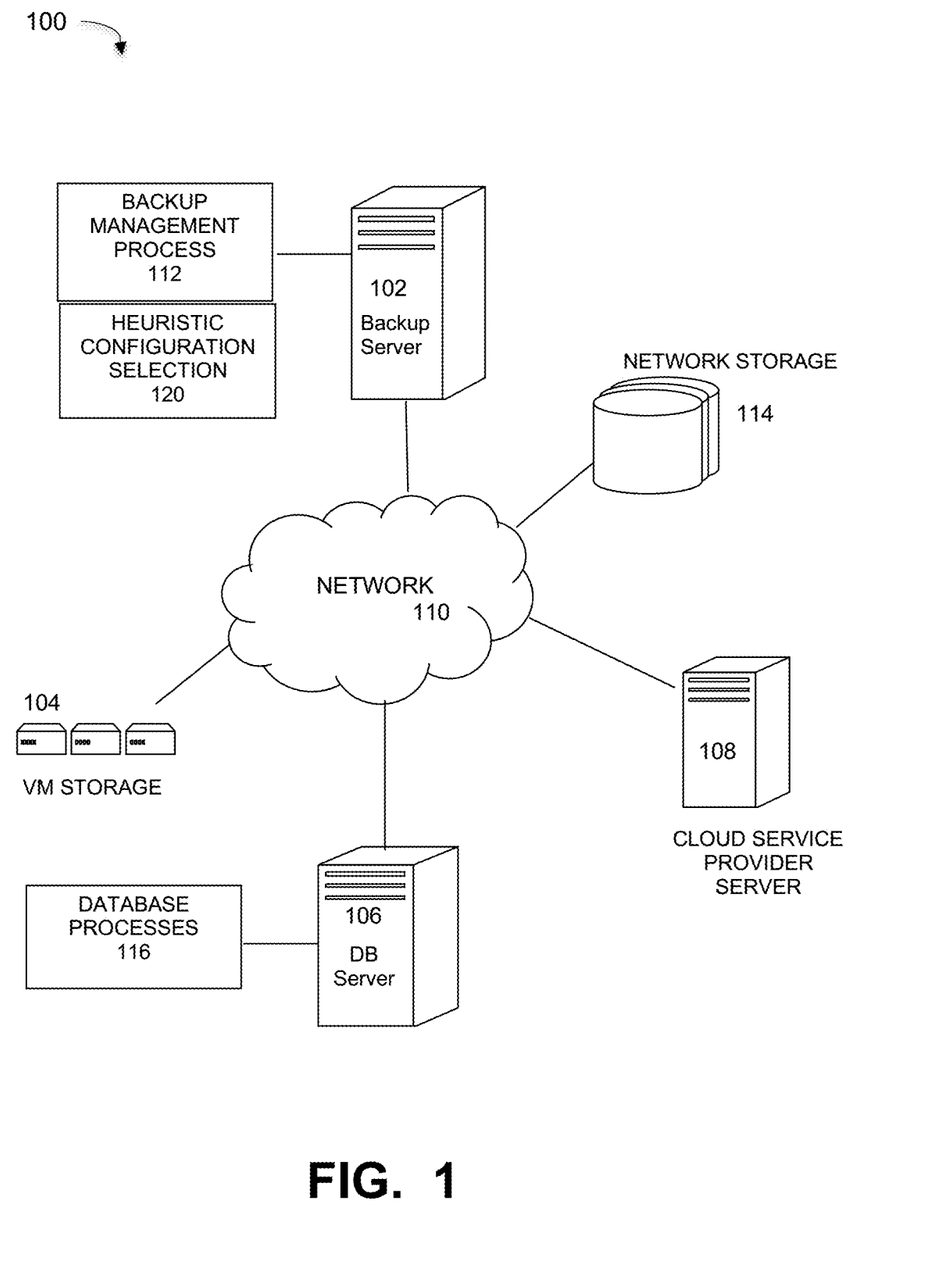
FIG. 1 illustrates a computer network system that implements one or more embodiments of a heuristic configuration selection process for optimizing backup performance, under some embodiments.

Embodiments are described for a system and method that automatically determines the configuration parameters needed to obtain optimal performance for a given backup/restore job in a data backup system. FIG. 1 illustrates a computer network system that implements one or more embodiments of a heuristic configuration selection process for optimizing backup performance, under some embodiments. In system 100, a backup server 102 executes a backup management process 112 that coordinates or manages the backup of data from one or more data sources, such as database server 106, to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as backup server 102, in the network environment.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, cloud network 110 may be a private network or it may be a public network provided by a third-party cloud service provider (CSP) 108. In this case, at least part of the infrastructure of network 110, such as servers, routers, interfaces and so on are provided to users such as backup server 102 as an IaaS (Infrastructure as a Service), SaaS (Software as a Service), PaaS (Platform as a Service), or other type of arrangement. The cloud provider 108 may be any company such as Amazon, EMC, Apple, Cisco, Citrix, IBM, Google, Microsoft, Salesforce.com, and so on. Depending on implementation, each cloud provider may show up as a cloud tier inside the file system for the user, such as the Data Domain file system.

The data generated or sourced by system 100 and transmitted over network 110 may be stored in any number of persistent storage locations and devices. In a backup case, the backup management process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source (e.g., 106) may be any appropriate data, such as database data that is part of a database management system, and the data may reside on one or more hard drives for the database(s) 116 in a variety of formats. In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible.

In a data backup system, such as shown in FIG. 1, the data protection software currently has certain configurable parameters that can be adjusted manually by the backup administrator to make the software operate at certain performance levels. Most of the time such manual options limit the capability of backup software to operate at optimal performance so that it adheres to the protection plan and compliance set aside by backup administrator. As mentioned in the Background section above, manual configuration typically has drawbacks, as values for those configurable parameters are mostly vary depending on use and system constraints. This results in unpredictable backup performance for given a environment.

For example, the backup/restore performance desired in each of below case may vary based on the situation/environment with respect to certain important characteristics. These may include: (1) ingest speed: there are obvious limits on data ingest rate from source devices; (2) time and type of backup: the expected backup speed can change based on time or type of backup, such as when an application is in use versus in a backup window, or a full back up versus an incremental backup; and (3) the backup speed: based on protection device capacity and current usage. These situations, among others, imposes challenges on deciding the optimal performance level manually and brings unpredictability in backup backup/restore job completion on time. In modern data centers, the predictability of every backup job performance has become a critical concern.

As shown in FIG. 1, system 100 includes a heuristic configuration selection process 120 as part of or accessible by the backup management process 112. This processing component provides a method to automatically determine the configuration parameters needed to obtain optimal performance for a given backup/restore job. This process involves identifying key parameters that determine backup performance and suggest means to derive and incorporate those configurable parameters into the backup software automatically. Embodiments can be applied to stream based (e.g., DDBoost) backups, or other types of backup software as well.

Present methods of performing backup operations simply involve a backup administrator configuring the backup job, which is then run by the backup software. The backup agent or host then copies the data to the protection storage, and the backup job is complete. In this case, the configuration is set and cannot be changed if conditions change, or the initial configuration was suboptimal. Embodiments of process 120 improve this basic process by providing mechanisms for the initial configuration to be iteratively adjusted based on performance measurements during the course of the backup operation. In this way, changing conditions or suboptimal configuration settings can be modified to ensure optimum performance.

Figure 2:
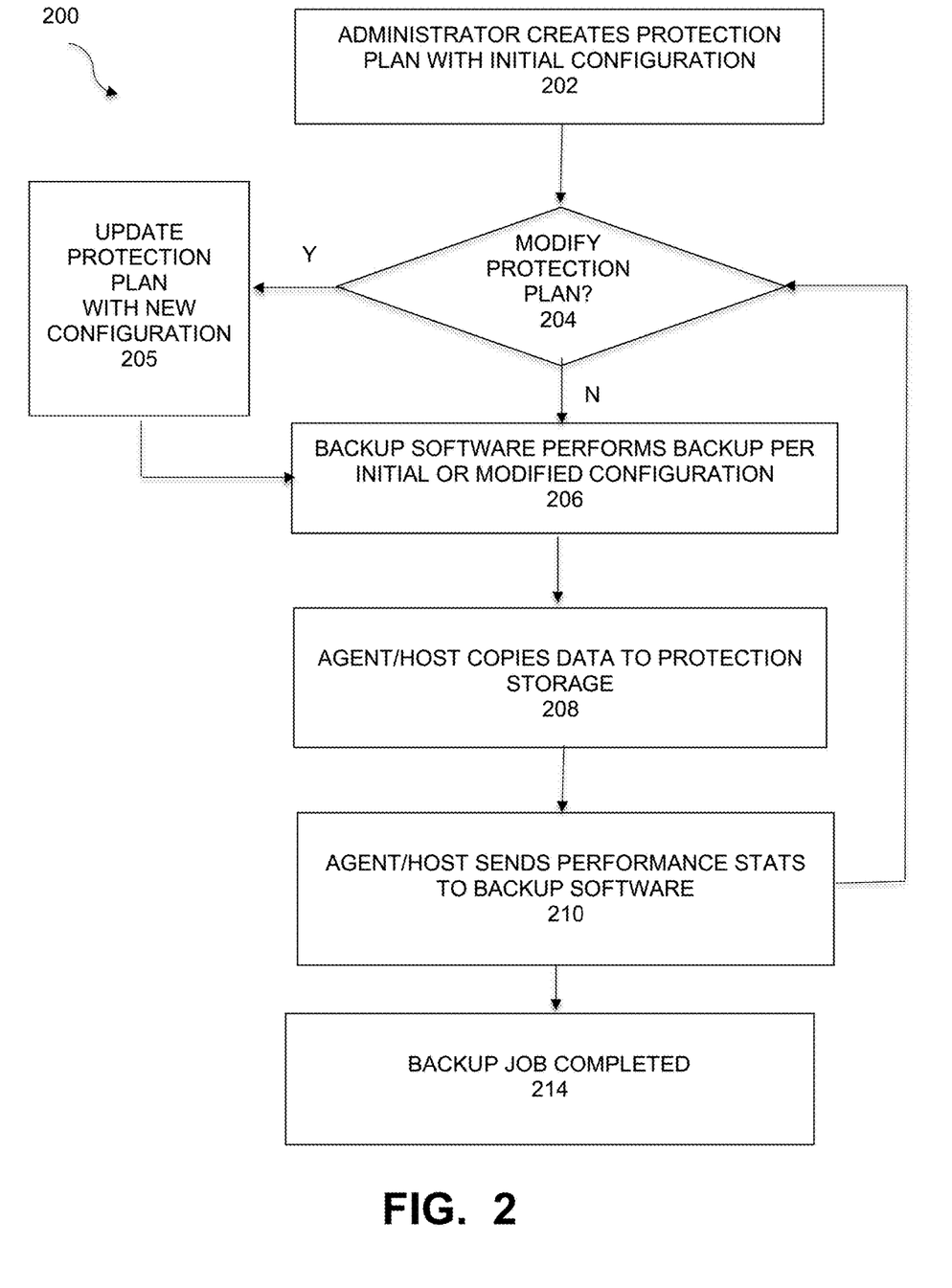
FIG. 2 is a flowchart that illustrates a method of determining and modifying configuration parameters to obtain optimal backup performance, under some embodiments.

FIG. 2 is a flowchart that illustrates a method of determining and modifying configuration parameters to obtain optimal backup performance, under some embodiments. As shown in FIG. 2, process 200 starts with the backup administrator configuring the backup job with an initial configuration setting, 202. Certain system parameters or limitations are set by the system as defined by the hardware or system itself, such as processor speed, network transmission speed, storage capacity and organization, and so on. These fixed parameters are generally not able to be set by the administrator. Other parameters, however, can be adjusted, and so this step entails the backup administrator defining and setting certain parameters to try to achieve certain performance objectives or maintain the overall balanced performance of the system as a whole.

After the initial configuration is set in step 202, the backup software runs the backup job as per this initial configuration, 206. In response, the agent or host copies the data to the protection storage media (e.g., RAID array or similar), 208. The agent or host monitors performance against key defined configuration parameters and sends the performance statistics back to the backup software running on the backup server, 210. In response, and if necessary as determined in decision block 204, the backup software adjusts the configuration settings as may be defined in a protection plan, 205, and then performs the backup with this new protection plan, 206. This process is performed iteratively with every backup job, and as long as there is a performance deviation between the performance expected and the actual performance as captured by the performance statistics, the initial or any subsequent modified configuration is updated, as determined in step 204, and then the backup job is completed, 214.

In an embodiment, the sending of the performance statistics by the agent/host is done after every successful backup job, as shown in step 210. The expected performance may be defined by the administrator in terms of certain quality of service (QoS), recovery point objectives (RPO), recovery time objectives (RTO), data throughput, data storage rate, and other similar metrics. A minimum amount of deviation between the expected and actual performance statistics may be defined by the administrator to act as a threshold to trigger the iterative cycle of sending the performance statistics and modifying the protection plan/configuration settings.

In an embodiment, the iterative adjustment of the backup job configuration can be limited by a set maximum number of iterations, such as to save time and hasten the completion of the backup job. Alternatively, it can be set to trigger only after a minimum deviation of performance statistics from defined normative values is reached. This approach reduces the number of handshakes needed for the backup job until a desired performance level is reached.

The dynamic and iteratively adjustable nature of the configuration changes during the backup operation leads to a heuristic method of continuously optimizing the performance of the backup system with respect to certain key identified configuration parameters.

In an embodiment, the key parameters determining backup performance can be categorized as either static (S) parameters in which the backup administrator has no control, or dynamic (D) parameters in which the backup administrator has some control. Table 1 below illustrates some possible parameters and their associated type, static or dynamic.

TABLE 1

| PARAMETER | TYPE |
| --- | --- |
| Read Throughput | Static |
| Performance Penalty % | Dynamic |
| #Channels/Stream | Dynamic |
| Write Throughput | Dynamic |

The parameters listed in Table 1 are examples of some key parameters, and embodiments are not so limited. Other parameters in addition to or instead of those listed above can be used under certain alternative embodiments.

As shown in Table 1, the first parameter is the read throughput or ingest speed, which is a static parameter. This the maximum READ performance which can be expected for the given host/agent being backed up. This is primarily determined by the type of primary storage, multi-pathing configurations, and file system layout. This parameter is determined by the server/storage administrator and the backup administrator generally has no control over it.

The second parameter is the performance penalty percentage, which is a dynamic parameter. This is the percentage of performance penalty allowed during backup such that impact to application performance is minimal. This can be set by the backup admin based on the backup job or plan. This parameter can be defined by two sets of values. The first is the backup window. During a backup window, the backup activity has highest precedence and the percentage backup performance penalty could be set higher. For example, a value of 100% means the entire server performance could be utilized for backup purposes, while a value of 50% means that only half the server performance is utilized for backups. The second value is the business hour value. That is, during business hours, the backup activity has least precedence so the value could set based on customer need. For example, a setting of 50% means that a maximum of 50% of server performance degradation is allowed for the backup activity.

The third parameter is the number of channels per streams (#Channel/Stream), which is a dynamic parameter. In a stream-based backup system, this is one of the most important parameters that determines the backup performance. This value could be dynamically determined based on heuristic data collected from previous jobs.

The fourth parameter is WRITE throughput, which is a dynamic parameter. This is the write throughput obtained for the backup job. This parameter can be tuned by adjusting the value for #Channel/Stream based on heuristic data collected from previous backup jobs. It should be noted that this is subjected to maximum throughput supported by the protection storage.

Figure 3:
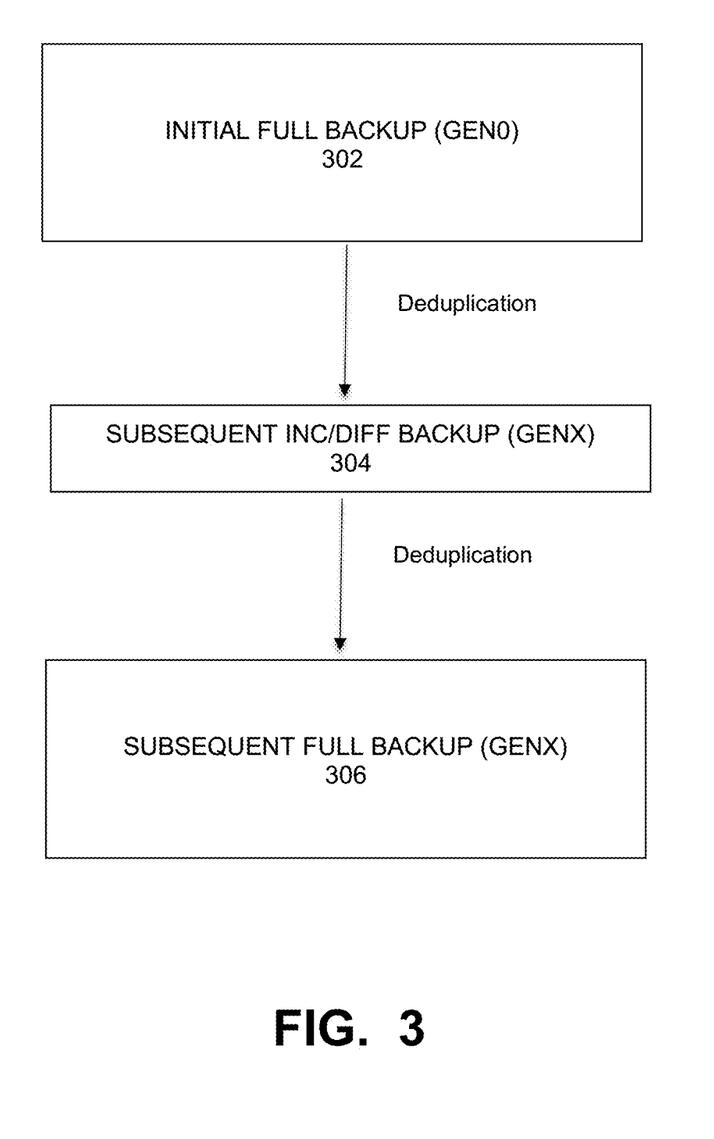
FIG. 3 illustrates operation of the heuristic configuration selection process for optimizing an example sequence of backup operations, under some embodiments.

FIG. 3 illustrates operation of the heuristic configuration selection process for optimizing an example sequence of backup operations, under some embodiments. As shown in FIG. 3, an initial full backup, 302, is referred to as a generation 0 (GEN0) backup and is a backup of all data to protection storage. This initial backup may be followed by any number of subsequent incremental or differential backups 304 that backup only changed data from a previous or initial full backup, or any number of subsequent full backups 304. These backups generate respective subsequent generations (GENX) of the data through deduplication backup processes (to reduce redundancies through compression techniques) and may be scheduled on a periodic basis in accordance with a backup schedule defined by the backup administrator. Typically incremental backups may be performed daily on an initial full backup set, while subsequent full backups may be performed on a longer period, such as monthly or quarterly. These periods are mentioned for purposes of example only, and any appropriate number and scheduling of subsequent incremental and full backups may be used.

In general, process 120 defines an optimal performance for a configuration based on configurable parameters available within the backup software. Thus, the ultimate output for process 120 will be a certain configuration parameters and associated values (e.g., channels/stream) for the backup operation.

The backup job sequence of FIG. 3 illustrates a method of determining optimal performance for a given backup job, under an example embodiment. For the initial copy (GEN0) backup 302, the backup performance for this initial copy will be different than subsequent full backups (GenX). In a database example, the initial copy (GEN0) has the whole database (DB) data transferred to protection storage with a relatively low deduplication rate. As this initial copy has more data to ingest into protection storage, the backup performance will be limited by maximum WRITE performance for given number of channels/stripe. In such case, the #Channel(s) needed for backup can be determined by the following formula:

$$\frac{\text{Read Throughput}}{\text{Single Stream Write Throughput}} * \text{Performance penalty \%}$$

For example, the minimum number of channels needed for optimal performance for a Unix host with a 1500 MB/s I/O ingest rate with 50% performance penalty to an example Data Domain appliance over Boost with DSP for Gen0 backup will be:

$$1500/235 \times 50\% = \sim 3 \text{Channel(s)}$$

In the above example, the value 235 Mbits/second is the per-channel write throughput for the specific protection storage device (e.g., DD7200). This number will vary per device, of course, and will typically be set for a certain device.

For a subsequent FULL (GenX) backup 306 after an initial full backup 302, this subsequent full backup needs to copy only the changed and deduplicated blocks to the protection storage. There will thus be a higher deduplication rate, so data ingested to the protection storage is expected to be much lower during this backup under a nominal rate of change. As the backup software has to traverse through entire source data to generate deduplicated full backup, the backup performance will be limited by maximum READ I/O performance for given number of channels/stripes. In such case, the #Channels needed for backup can be lot lower than the full backup case above, and can be determined by the following formula:

$$\frac{\text{Read Throughput}}{\text{Single Stream Write Throughput}} * Perf. \text{ penalty \%} \div \text{Deduplication \%}$$

For example, the minimum channel(s) needed for optimal performance for a Unix AA host with 1500 MB/s I/O ingest rate with 50% performance penalty to a DD7200 over Boost with DSP for GenX FULL backup with 20% de-duplication will be $$1500/235 \times 50\% \div 20 = \sim 1 \text{Channel(s)}$$

Where again, the value 235 Mbits/second is the per-channel write throughput for the specific protection storage device (e.g., DD7200).

For an incremental or differential backup (GenX) 304 with Block Change Tracking (BCT), there is a predetermined list of blocks to be copied to protection storage. In such case backup will have almost similar performance as the initial copy (Gen0) 302. In this case, the backup software has to traverse through entire source data (e.g., SCN for Oracle) to generate changed blocks. This will slow the ingest rate to protection storage, and in such a case the backup will have almost similar performance as Gen0 full backup.

Figure 4:
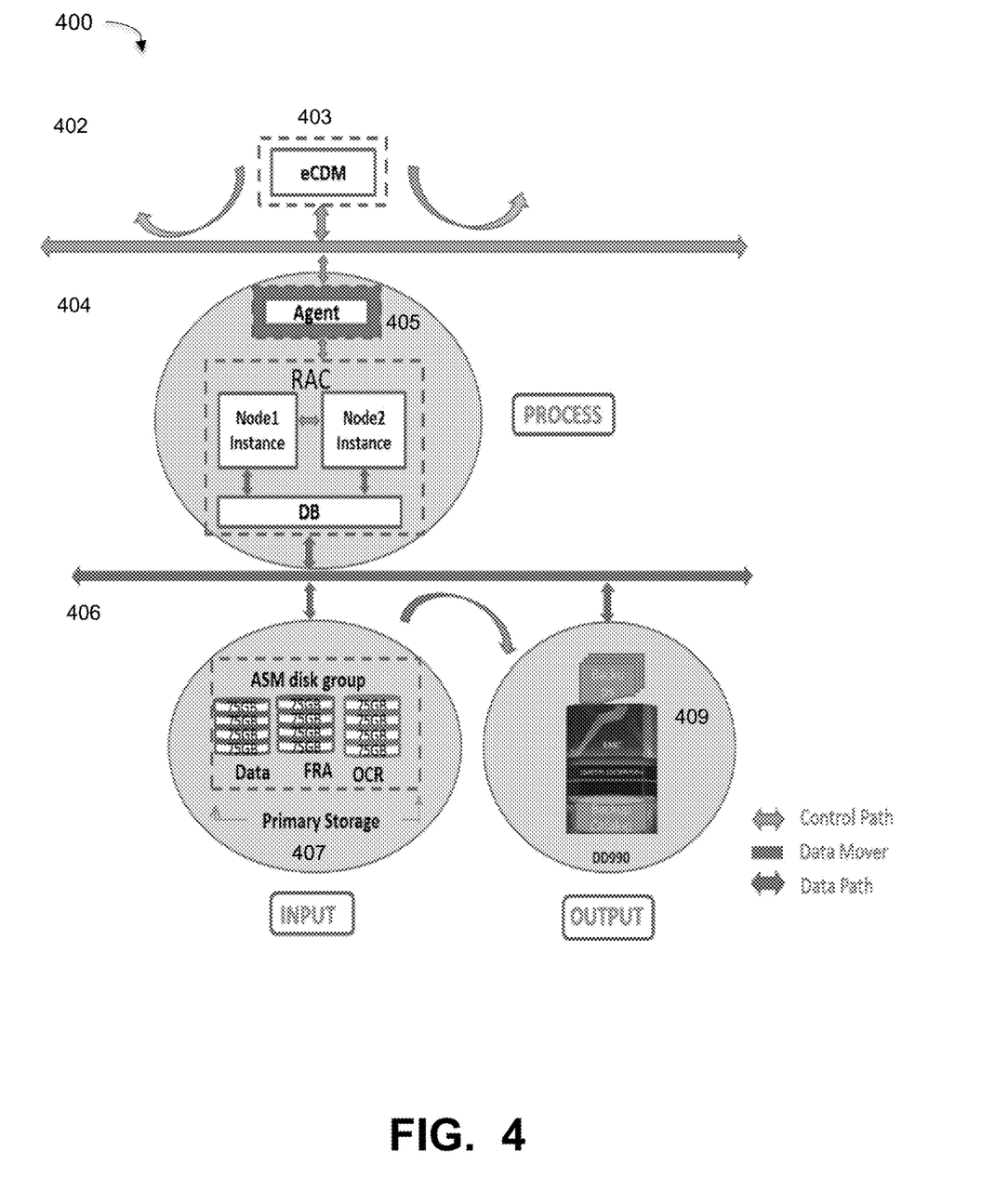
FIG. 4 illustrates an enterprise copy data management system and deduplication backup system that use a heuristic configuration selection process, under some embodiments.

Embodiments of the heuristic configuration selection process 120 are meant to be used with eCDM system and a deduplication backup system, though embodiments are not so limited. Enterprise copy data management is an emerging modern protection software based in micro service architecture. Diagram 400 of FIG. 4 illustrates the operation of process 120 with respect to the eCDM layer 402, an agent layer 404, and the storage layer 406. The eCDM process 403 communicates with agent 405 over a control path to a control agent having node instances accessing a database. The database data is stored in primary storage 407 and backed up through a data path to protection storage (e.g., Data Domain appliance) 409.

Figure 5:
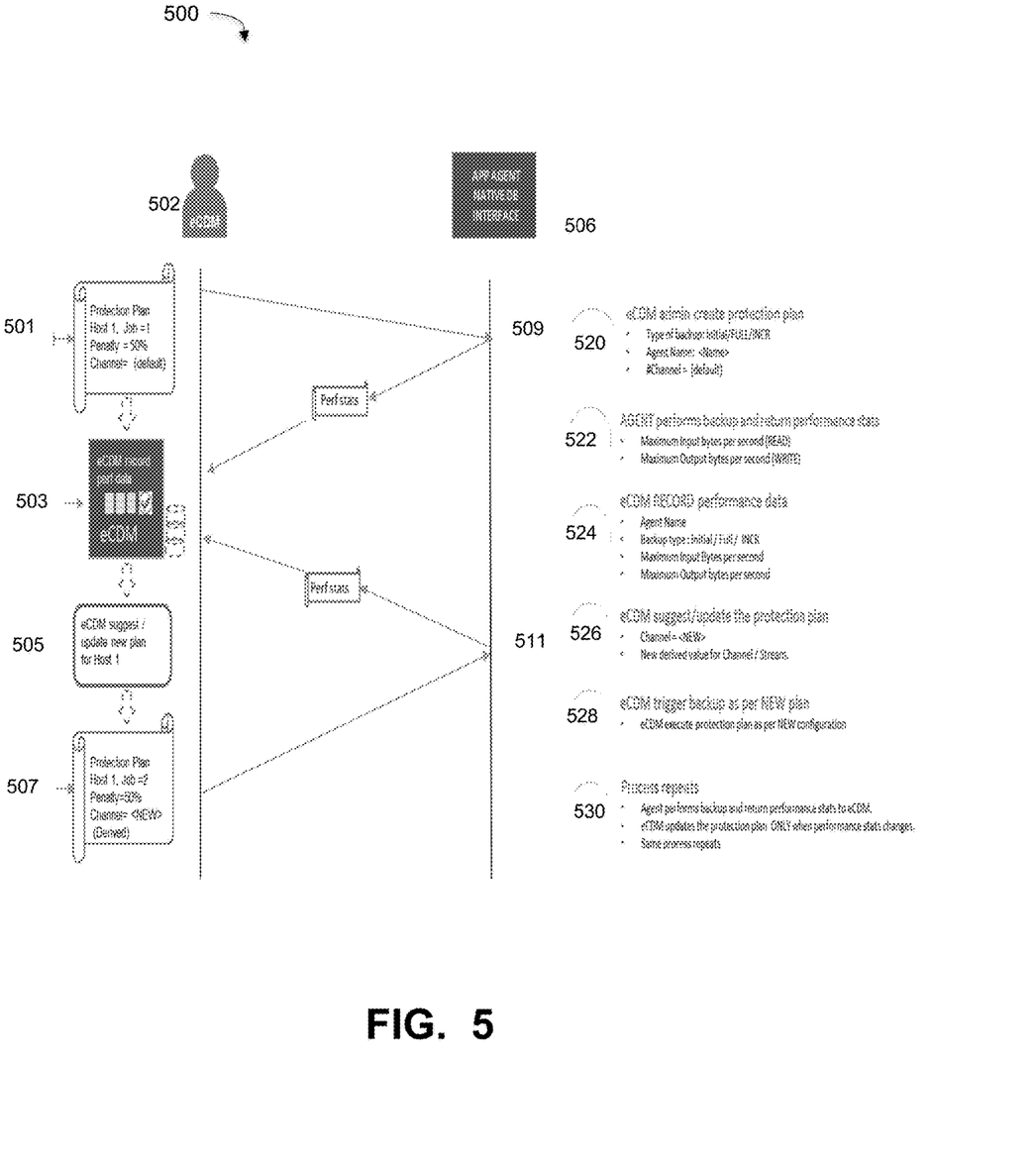
FIG. 5 is a flow diagram that illustrates the operation the heuristic configuration selection process in an eCDM system, under some embodiments.

FIG. 5 is a flow diagram that illustrates the operation the heuristic configuration selection process in an eCDM system, under some embodiments. Diagram 500 of FIG. 5 shows the data elements produced and processed for the eCDM system or user 502 and the processing steps performed by the application agent or native DB interface 506. In step 520, the eCDM administrator 502 creates a protection plan 501 for the designated host with an initial configuration for a backup. This initial configuration can be of the format:

a. Agent Name: <host name>
b. Agent Type: Oracle/SQL
c. Protection plan: Initial/Full/INCR
d. #Channel=<Default>
e. Backup performance penalty=xx %

The application agent performs the DB backup in step 522 as per the initial configuration and returns performance stats back to eCDM through instance 509. The performance statistics can consist of the following data Maximum Input Bytes per second (READ)
Maximum Output Bytes per second (WRITE)

In step 522, the eCDM update performance data record 502 of the agent after verifying with existing record (if any). For example:

a. Agent Name:
b. Backup Type:
c. Maximum Input bytes per second (READ)=<VALUE>
d. Maximum Output bytes per second (WRITE)=<VALUE>

During next backup schedule, the eCDM process refers to the latest performance stats from instance 511 for a given agent and derives the optimal #Channel/Streams configuration for given backup job. In step 526, the eCDM may update its protection plan as per the new configuration 505. In step 528, the eCDM triggers a new backup job with the updated configuration with optimal performance level. The application agent performs the DB backup as per the new configuration and return new performance stats to eCDM. This process repeats and continues in step 530 and the agent will always have its optimal backup performance levels.

Under certain embodiments, all devices in a backup system, i.e., the primary storage, protection storage and data host, are optimally utilized to derive the best backup performance. At the same time, prescribed methods like a quality of service (QoS) implementation for backup jobs can be used to ensure that backup resources (e.g., host, primary storage and protection storage) are never under-utilized or over-utilized.

The protection storage will be utilized to its full performance levels, thus reducing backup time. The backup (e.g., data domain) stream selection based on host I/O performance ensures that streams are utilized optimally when host I/O performance is low.

Protection plans can be created with certain recovery point objectives (RPO) in mind. For example, in current implementations, eCDM cannot validate RPO target in absence of past backup performance statistics for a given agent. Under process 120, the backup software will be able to validate the RPO target based on available performance data and generate an early alert to the backup administrator when it is found to be unrealistic. Furthermore, the eCDM backup administrator does not need to have in-depth knowledge about either primary or protection storage. Backup administrators are thus freed from performance level activity monitoring.

Following is an example implementation plan for an eCDM/Oracle Agent in a specific application:

```
Algorithm: Channel selection
Input: Backup type, performance penalty (%)
Derived input: Ingest rate, Backup count, throughput per channel, BCT
Output: #Channels
Ingest rate: <input>
perf penalty: <input> %
btype: <derived input>
BCT: <Y/N>
bcount: <derived input>
de-duplication ratio: <input:default>
tp per channel: <input:default>
channel: <input:default>
if
    btype = "Full"
        if bcount = 0 then
            channel = (ingest rate ÷ tp per channel) * perf penalty %
            return channel
        if bcount > 0
    channel = (ingest rate ÷ tp per channel ) ÷ de-duplication ratio
            return channel
    btype = "INCR"
        if BCT = "YES"
    channel = (ingest rate ÷ tp per channel) * perf penalty %
        return channel
    if BCT = "No"
    channel = (ingest rate ÷ tp per channel ) ÷ de-duplication ration
            return channel
```

In the above example, performance_penalty % is a user input from backup admin (gathered via eCDM policy) to control performance impact on agent due to backup task. The Backup_Type is already provided through an API from the eCDM system. For the determining_READ_performance/ingest_rate, Oracle RMAN (recovery manager) has built in performance stats to report on performance values like I/O input bytes per second for past backup jobs.

select avg(INPUT_BYTES_PER_SEC) from V\$RMAN_BACKUP_JOB_DETAILS where input_type like '% DB FULL %';
select avg(INPUT_BYTES_PER_SEC) from V\$RMAN_BACKUP_JOB_DETAILS where input_type like '% DB INCR %';

For the first backup, ingest performance can be determined with 'Backup VALIDATE' command.

The determining_backup_count could be derived either from eCDM backup catalogue or using an RMAN query as stated above. For the determining write throughput performance per channel: DD has per channel performance report published for each DD model.

The deduplication rate could be pre-defined for DDBoost FULL backups (E.g. 25%) or determined from DD stats with command such as "ddboost show stats". For Communication with eCDM, an existing API (e.g., ddbmcon) with JSON/Bread Crumbs mechanism could be used for communication between agent and eCDM.

The above program code segment and application example are provided for purposes of example only, and embodiments are not so limited. Any similar program code can be used for different applications.

System Implementation

Embodiments of the processes and techniques described above can be implemented on any appropriate backup system operating environment or file system, or network server system. Such embodiments may include other or alternative data structures or definitions as needed or appropriate.

Figure 6:
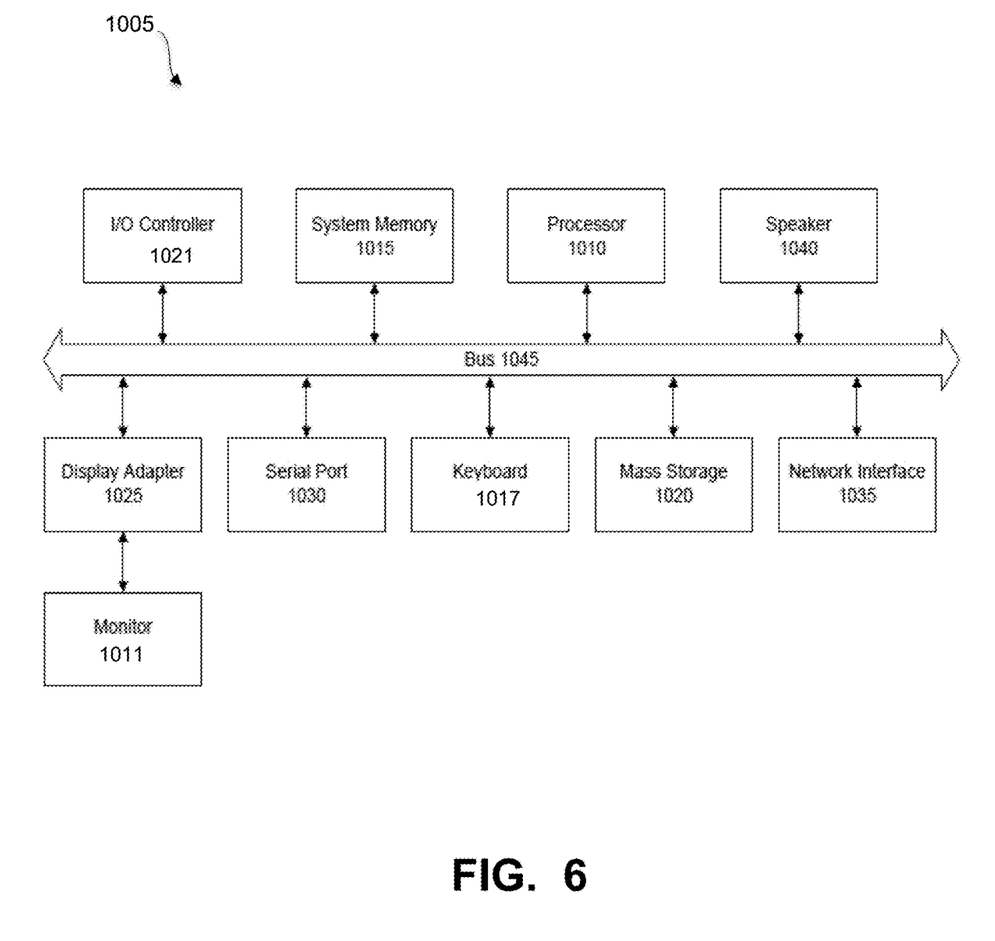
FIG. 6 is a system block diagram of a computer system used to execute one or more software components of the network tuning process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 6 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 6 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method comprising:
creating a protection plan with an initial configuration for resources in a data storage system;
performing, by a backup program executed by a backup server processor, a backup operation in accordance with the initial configuration;
copying, by a backup program agent, data from a data source to protection storage;
sending, by the backup program agent, performance statistics to the backup software;
modifying the initial configuration to a modified configuration in response to the performance statistics;
completing the backup operation when the performance statistics meet defined minimum requirements;
defining an expected performance measurement based on a plurality of configuration parameters;
determining an actual performance measurement based on each of the plurality of configuration parameters;
comparing the actual performance measurement to the expected performance measurement to derive a difference measure; and repeating, if the difference measure is above a defined threshold, the modifying step, or otherwise completing the backup operation.

2. The method of claim 1, wherein the resources comprise at least one of: host data server resources, primary storage media, and protection storage media.

3. The method of claim 1 wherein the performance statistics are gathered for a first backup job, and wherein the modified configuration is applied to a second backup job to improve a performance of the second backup job.

4. The method of claim 3 wherein subsequent modified configurations are applied to subsequent backup jobs after the second backup job to improve a performance of each respective subsequent backup job.

5. The method of claim 1 wherein the initial configuration comprises a protection plan for the data source, the protection plan designating a backup type as one of an initial full backup, a subsequent full backup, and a subsequent incremental or differential backup.

6. The method of claim 5 wherein the initial configuration comprises a backup performance penalty representing a percentage of backup performance degradation that is acceptable to a backup administrator.

7. The method of claim 6 wherein the performance statistics specify a number of minimum channels needed to meet a desired backup performance as defined by the backup performance penalty.

8. The method of claim 1 wherein the performance measurement is defined by a backup administrator in terms of certain quality of service (QoS), recovery point objectives (RPO), recovery time objectives (RTO), data throughput, and data storage rate metrics.

9. The method of claim 1 wherein the backup system comprises a deduplication backup server running a Data Domain file system (DDFS).

10. The method of claim 9 wherein the backup system comprises an enterprise copy data management system.

11. A system having resources including host data server resources, primary storage media, and protection storage media, and comprising:
    a database storing a protection plan created with initial configuration of the resources in the system;
    a processor executing program code performing a backup operation executed by a backup server in accordance with the initial configuration; and
    a backup program agent copying data from a data source to protection storage, sending performance statistics to the backup software, modifying the initial configuration to a modified configuration in response to the performance statistics, completing the backup operation when the performance statistics meet defined minimum requirements, defining an expected performance measurement based on a plurality of configuration parameters, determining an actual performance measurement based on each of the plurality of configuration parameters,
    comparing the actual performance measurement to the expected performance measurement to derive a difference measure, and repeating, if the difference measure is above a defined threshold, the modifying step, or otherwise completing the backup operation.

12. The system of claim 11 wherein the backup server completes the backup operation when the performance statistics meet defined minimum requirements.

13. The system of claim 12 wherein the performance statistics are gathered for a first backup job, and wherein the modified configuration is applied to a second backup job to improve a performance of the second backup job, and wherein subsequent modified configurations are applied to subsequent backup jobs after the second backup job to improve a performance of each respective subsequent backup job.

14. The system of claim 13 wherein the initial configuration comprises a protection plan for the data source, the protection plan designating a backup type as one of an initial full backup, a subsequent full backup, and a subsequent incremental or differential backup.

15. The system of claim 14 wherein the initial configuration comprises a backup performance penalty representing a percentage of backup performance degradation that is acceptable to a backup administrator.

16. The system of claim 15 wherein the performance statistics specify a number of minimum channels needed to meet a desired backup performance as defined by the backup performance penalty.

17. The system of claim 11 wherein the performance measurement is defined by a backup administrator in terms of certain quality of service (QoS), recovery point objectives (RPO), recovery time objectives (RTO), data throughput, and data storage rate metrics.

18. The system of claim 12 wherein the system comprises a deduplication backup server running a Data Domain file system (DDFS).

19. A computer program product, comprising a non-transitory computer-readable medium having a computer-readable program code embodied therein, the computer-readable program code adapted to be executed by one or more processors to implement a method by:
    creating a protection plan with an initial configuration for resources in a data storage system;
    performing, by a backup program executed by a backup server processor, a backup operation in accordance with the initial configuration;
    copying, by a backup program agent, data from a data source to protection storage;
    sending, by the backup program agent, performance statistics to the backup software;
    modifying the initial configuration to a modified configuration in response to the performance statistics; and
    completing the backup operation when the performance statistics meet defined minimum requirements;
    defining an expected performance measurement based on a plurality of configuration parameters;
    determining an actual performance measurement based on each of the plurality of configuration parameters;
    comparing the actual performance measurement to the expected performance measurement to derive a difference measure; and
    repeating, if the difference measure is above a defined threshold, the modifying step, or otherwise completing the backup operation.

20. The computer program product of claim 19 wherein the initial configuration comprises a backup performance penalty representing a percentage of backup performance degradation that is acceptable to a backup administrator, and further wherein the performance statistics specify a number of minimum channels needed to meet a desired backup performance as defined by the backup performance penalty.

* * * * *